United States Patent
Hong

(10) Patent No.: US 11,184,781 B2
(45) Date of Patent: Nov. 23, 2021

(54) METHOD AND APPARATUS FOR PROTECTING USER EQUIPMENT, USER EQUIPMENT, AND BASE STATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/627,972

(22) PCT Filed: Aug. 10, 2017

(86) PCT No.: PCT/CN2017/096822
§ 371 (c)(1),
(2) Date: Dec. 31, 2019

(87) PCT Pub. No.: WO2019/028739
PCT Pub. Date: Feb. 14, 2019

(65) Prior Publication Data
US 2020/0169898 A1    May 28, 2020

(51) Int. Cl.
*H04W 24/02* (2009.01)
*G06F 1/20* (2006.01)
(Continued)

(52) U.S. Cl.
CPC ............ *H04W 24/02* (2013.01); *G06F 1/206* (2013.01); *H04L 41/0813* (2013.01);
(Continued)

(58) Field of Classification Search
CPC ........ Y02D 30/70; Y02D 10/00; Y02D 30/00; H04W 24/02; H04W 76/28; H04W 24/10;
(Continued)

(56) References Cited

U.S. PATENT DOCUMENTS

| 9,019,880 B2 | 4/2015 | Ehsan et al. |
| 2012/0297223 A1 | 11/2012 | Wu et al. |

(Continued)

FOREIGN PATENT DOCUMENTS

| CN | 101868021 A | 10/2010 |
| CN | 101938819 A | 1/2011 |

(Continued)

OTHER PUBLICATIONS

3GPP TSG-RAN WG2 Meeting #98, R2-1706075 by Huawei et al., dated May 15-19, 2017 (Year: 2017).*

(Continued)

*Primary Examiner* — Daniel Lai
(74) *Attorney, Agent, or Firm* — Finnegan, Henderson, Farabow, Garrett & Dunner, L.L.P.

(57) ABSTRACT

A method for protecting user equipment includes: starting a timer of a first preset time period after first signaling for requesting for a cooling configuration is sent to a base station; detecting an equipment temperature of the user equipment at a time when the timer times out; and indicating to the base station a user equipment state indicated by the equipment temperature.

10 Claims, 7 Drawing Sheets

(51) Int. Cl.
*H04L 12/24* (2006.01)
*H04L 29/06* (2006.01)
*H04W 8/24* (2009.01)
*H04W 24/10* (2009.01)

(52) U.S. Cl.
CPC .............. *H04L 69/28* (2013.01); *H04W 8/24* (2013.01); *H04W 24/10* (2013.01)

(58) Field of Classification Search
CPC ... H04W 88/02; H04W 8/24; H04W 52/0216; H04W 4/38; H04W 52/0229; H04W 52/0251; H04W 24/04; H04W 4/00; H04W 72/0406; H04W 72/042; H04W 76/27; H04W 28/06; H04W 52/00; H04W 52/0235; H04W 52/0258; H04W 52/0267; H04W 52/028; H04W 52/22; H04W 52/281; H04W 52/30; H04W 52/36; H04W 52/367; H04W 52/52; H04W 8/22; G06F 1/206; H04L 41/0813; H04L 69/28; H04L 43/08

See application file for complete search history.

(56) References Cited

U.S. PATENT DOCUMENTS

| | | | | |
|---|---|---|---|---|
| 2014/0086121 | A1* | 3/2014 | Emeott | G06F 9/445 370/311 |
| 2014/0341105 | A1* | 11/2014 | Vardhan | H04W 24/02 370/315 |
| 2015/0358810 | A1* | 12/2015 | Chao | H04W 4/50 455/418 |
| 2016/0262143 | A1* | 9/2016 | Breuer | H04W 72/085 |
| 2016/0337072 | A1 | 11/2016 | Yang et al. | |
| 2020/0221289 | A1* | 7/2020 | Lee | H04L 5/001 |

FOREIGN PATENT DOCUMENTS

| | | |
|---|---|---|
| CN | 102186227 A | 9/2011 |
| CN | 203217401 U | 9/2013 |
| CN | 103384394 A | 11/2013 |
| CN | 103765963 A | 4/2014 |
| CN | 104536483 A | 4/2015 |
| CN | 106020387 A | 10/2016 |
| CN | 107820715 A | 3/2018 |
| EP | 2 312 759 A1 | 4/2011 |
| EP | 3 661 274 A1 | 6/2020 |
| EP | 3 668 155 A1 | 6/2020 |
| JP | H 0738594 B2 | 4/1995 |
| JP | 4846041 B2 | 12/2011 |
| JP | 2011259282 A | 12/2011 |
| KR | 20120124140 A | 11/2012 |
| RU | 2311735 C2 | 11/2007 |
| WO | WO 2016/057219 A1 | 4/2016 |
| WO | WO 2017/099891 A1 | 6/2017 |

OTHER PUBLICATIONS

3GPP TSG-RAN WG2 Meeting #98, R2-1706076 by Huawei et al., dated May 15-19, 2017 (Year: 2017).*
U.S. Appl. No. 62/537,005 (Priority document of Lee, US-20200221289-A1), dated Jul. 26, 2017 (Year: 2017).*
LG Electronics Inc., Assistance information for UE requested configuration change, 3GPP TSG-RAN2 Meeting #97Bis, Spokane, USA, Apr. 3-7, 2017, 4 pgs.
Xiaomi Communications, On the UE overheating problem, 3GPP TSG-RAN Meeting #98, Hangzhou, China, May 15-19, 2017, 3 pgs.
Extended European Search Report in the European application No. 17920765.9, dated Jun. 30, 2020.
First Office Action of Russian Application No. 2020109680 dated Jun. 26, 2020.
Huawei, HiSilicon, MediaTek Inc., *Thermal Issues with high capability UEs*, 3GPP TSG-RAN WG2 #97, Athens, Greece, Feb. 13-17, 2017, 5 pgs.
International Search Report of PCT Application No. PCT/CN2017/096822, dated Apr. 28, 2018.
First Office Action of Indian Application No. 202027009081 dated Apr. 27, 2021.
First Office Action of Japanese Application No. 2019-571241 dated Apr. 13, 2021.

* cited by examiner

METHOD AND APPARATUS FOR PROTECTING USER EQUIPMENT, USER EQUIPMENT, AND BASE STATION

CROSS REFERENCE TO RELATED APPLICATIONS

This application is a national phase application based on PCT/CN2017/096822, filed Aug. 10, 2017, the content of which is incorporated herein by reference.

TECHNICAL FIELD

The present disclosure generally relates to the field of wireless communication technologies, and more particularly, to a method and a device for protecting user equipment, user equipment and a base station.

BACKGROUND

In Long Term Evolution (LTE) systems, wireless transmission modes such as high-order Multiple-Input Multiple-Output (MIMO), multi-carrier aggregation or high-order modulation decoding can be set for User Equipment (UE) so as to meet the users' requirements for a high data transmission rate. However, such high-speed wireless transmission modes may lead to UE overheating, which in turn may result in interruption of transmission of UE's transaction data or even restarting of the equipment.

In relevant technologies, in order to ensure a good experience for users when they are using the UE, UE providers generally perform temperature control on mobile phones. For example, the UE can be controlled to reduce a radio link configuration by detaching and reattaching so as to avoid the UE overheating. However, during the process of the detaching and reattaching of the UE, interruption of transaction data transmission may be caused, which degrades users' experience.

SUMMARY

According to a first aspect of embodiments of the present disclosure, there is provided a method for protecting user equipment, applied to the user equipment, the method including:

starting a timer of a first preset time period after first signaling for requesting for a cooling configuration is sent to a base station;

detecting an equipment temperature of the user equipment at a time when the timer times out; and indicating to the base station a user equipment state indicated by the equipment temperature.

According to a second aspect of embodiments of the present disclosure, there is provided a method for protecting user equipment, applied to a base station, the method including:

receiving first signaling for requesting for a cooling configuration sent by the user equipment;

generating and sending response signaling based on the first signaling, wherein the response signaling is used for reducing a radio link configuration of the user equipment;

monitoring signaling sent by the user equipment during a second preset time period; and determining a user equipment state of the user equipment based on a monitoring result.

According to a third aspect of embodiments of the present disclosure, there is provided a device for protecting user equipment, applied to the user equipment, the device including:

a timing module configured to start a timer of a first preset time period after first signaling for requesting for a cooling configuration is sent to a base station;

a detecting module configured to detect an equipment temperature of the user equipment at a time when the timer started by the timing module times out; and a state indication module configured to indicate to the base station a user equipment state indicated by the equipment temperature.

According to a fourth aspect of embodiments of the present disclosure, there is provided a device for protecting user equipment, applied to a base station, the device including:

a receiving module configured to receive first signaling for requesting for a cooling configuration sent by the user equipment;

a response module configured to generate and send response signaling based on the first signaling received by the receiving module, where the response signaling is used for reducing a radio link configuration of the user equipment;

a monitoring module configured to monitor signaling sent by the user equipment during a second preset time period after the first signaling is received by the receiving module; and a state determination module configured to determine a user equipment state of the user equipment based on a monitoring result.

According to a fifth aspect of embodiments of the present disclosure, there is provided user equipment, including:

a processor; and a memory for storing instructions executable by the processor, wherein the processor is configured to:

start a timer of a first preset time period after first signaling for requesting for a cooling configuration is sent to a base station;

detect an equipment temperature of the user equipment at a time when the timer times out; and indicate to the base station a user equipment state indicated by the equipment temperature.

According to a sixth aspect of embodiments of the present disclosure, there is provided a base station, including:

a processor; and a memory for storing instructions executable by the processor, wherein the processor is configured to:

receive first signaling for requesting for a cooling configuration sent by user equipment;

generate and send response signaling based on the first signaling, wherein the response signaling is used for reducing a radio link configuration of the user equipment;

monitor signaling sent by the user equipment during a second preset time period; and determine a user equipment state of the user equipment based on a monitoring result.

According to a seventh aspect of embodiments of the present disclosure, there is provided a non-transitory computer-readable storage medium having stored thereon computer instructions that, when executed by a processor, causes the processor to perform steps of:

starting a timer of a first preset time period after first signaling for requesting for a cooling configuration is sent to a base station;

detecting an equipment temperature of the user equipment at a time when the timer times out; and indicating to the base station a user equipment state indicated by the equipment temperature.

According to an eighth aspect of embodiments of the present disclosure, there is provided a non-transitory computer-readable storage medium having stored thereon computer instructions that, when executed by a processor, causes the processor to perform steps of:

receiving first signaling for requesting for a cooling configuration sent by user equipment;

generating and sending response signaling based on the first signaling, wherein the response signaling is used for reducing a radio link configuration of the user equipment;

monitoring signaling sent by the user equipment during a second preset time period; and determining a user equipment state of the user equipment based on a monitoring result.

The technical solutions provided by embodiments of the present disclosure can have the following beneficial effects.

When it is determined that the user equipment is overheated because of a high radio link configuration, the user equipment can send to the base station the first signaling for requesting for the cooling configuration, start the timer of the first preset time period after sending the first signaling, detect the equipment temperature at the time when the timer times out, and indicate to the base station the user equipment state indicated by the equipment temperature, such as the equipment is still overheated or is no longer overheated. Therefore, the problem of UE overheating can be solved by reducing the UE configuration by the base station and problems of transmission interruption of transaction data in relevant technologies can be avoided.

It is to be understood that both the foregoing general description and the following detailed description are exemplary only and are not restrictive of the present invention, as claimed.

BRIEF DESCRIPTION OF THE DRAWINGS

The accompanying drawings, which are incorporated in and constitute part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1A:
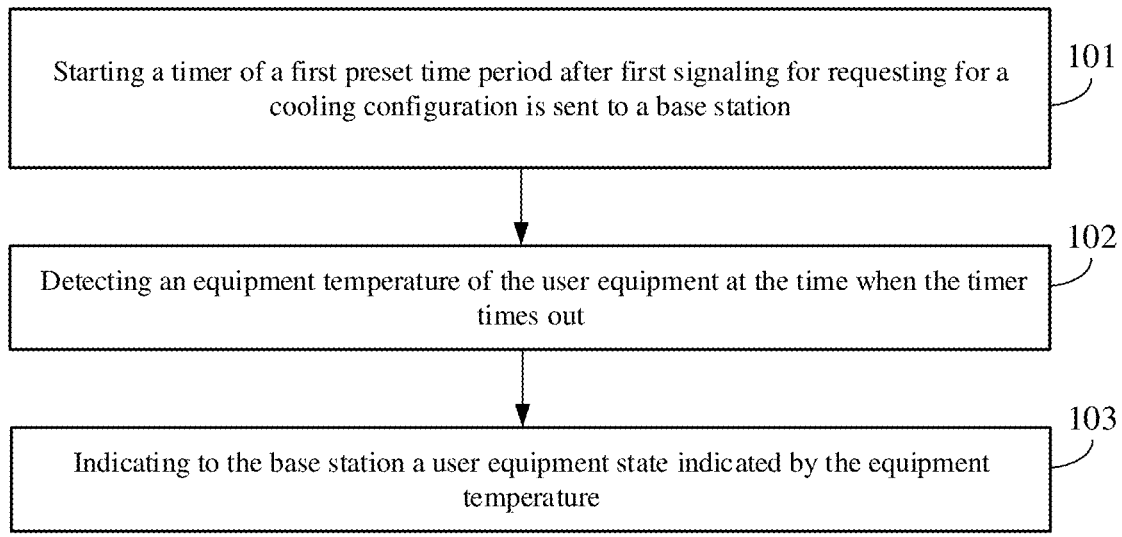
FIG. 1A is a flowchart illustrating a method for protecting user equipment according to an exemplary embodiment.
Figure 1B:
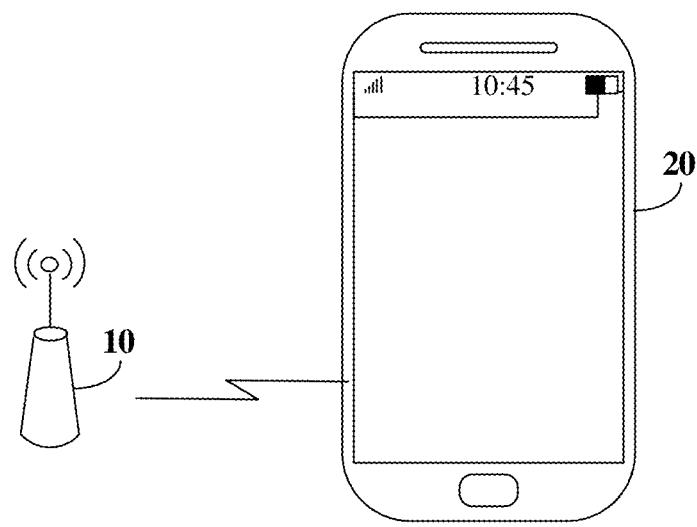
FIG. 1B is a diagram illustrating a scenario for a method for protecting user equipment according to an exemplary embodiment.

FIG. 1A is a flowchart illustrating a method for protecting user equipment (UE) according to an exemplary embodiment, and FIG. 1B is a diagram illustrating a scenario for a method for protecting user equipment according to an exemplary embodiment. The method for protecting the user equipment can be applied to the user equipment, and as illustrated in FIG. 1A, the method includes the following steps 101-103.

In step 101, a timer of a first preset time period is started after first signaling for requesting for a cooling configuration is sent to a base station.

In an embodiment, the first signaling may be UEAssistanceInformation signaling. In an embodiment, the first signaling carries cooling assistance information for instructing the base station to solve the problem of user equipment overheating, and the cooling assistance information can include information indicative of low performance caused by overheat, temporary user equipment capability represented by user equipment category (ue-Category) due to overheat, and/or temporary user equipment capability represented by radio frequency parameters (rf-Parameters-v14xy) due to overheat. For the first signaling, reference can be made to the following codes:

```
UEAssistanceInformation-r11 ::= SEQUENCE {
UEAssistanceInformation
criticalExtensions    CHOICE {
        c1                      CHOICE {
        ueAssistanceInformation-r11   UEAssistanceInformation-r11-IEs,
        spare3 NULL, spare2 NULL, spare1 NULL
        },
        criticalExtensionsFuture    SEQUENCE { }
    }
}
UEAssistanceInformation-r11-IEs ::=    SEQUENCE {
    powerPrefIndication-r11         ENUMERATED         {normal,
lowPowerConsumption} OPTIONAL,
        lateNonCriticalExtension        OCTET STRING        OPTIONAL,
        nonCriticalExtension    UEAssistanceInformation-v14xy-IEs
        OPTIONAL
    }
UEAssistanceInformation-v14xy-IEs ::=        SEQUENCE {
    bw-Preference-r14      BW-Preference-r14
bandwidth preference OPTIONAL,
        sps-AssistanceInformation-r14      SPS-AssistanceInformation-r14
        SPS assistance information OPTIONAL,
        temp-UE-Capability-r14
Temp-UE-Capability-r14OPTIONAL
        temporary UE capability
        nonCriticalExtension            SEQUENCE {}    OPTIONAL
    }
    Temp-UE-Capability-r14-IEs ::=    SEQUENCE    {
temporary UE capability
    Lower-Performance            BOOLEAN        OPTIONAL,
    lower performance
    ue-Category                  INTEGER (1..5)OPTIONAL,
    UE category
    rf-Parameters-v14xy          RF-Parameters-v14xy
OPTIONAL,
    radio frequency parameters
    nonCriticalExtension         SEQUENCE { }       OPTIONAL
}
```

In an embodiment, the timer of the first preset time period can be indicated to the user equipment by the base station via Radio Resource Control (RRC) signaling, such as Other Configuration (Otherconfig) signaling in RRC connection reconfiguration signaling.

In an embodiment, the timer may be started immediately at the moment when the first signaling is sent, and thus the timing at which the timer starts can be the timing at which the first signaling is sent.

In an embodiment, whether the user equipment is overheated can be determined by determining whether a temperature of the user equipment exceeds a preset temperature threshold for a period of time, and when the user equipment is overheated, the first signaling for requesting for the cooling configuration is sent to the base station. For example, it can be determined that the user equipment is overheated when the temperature of the user equipment exceeds 85 degrees for 5 minutes.

In step 102, an equipment temperature of the user equipment at a time when the timer times out is detected.

In an embodiment, the equipment temperature of the user equipment can be a surface temperature of a battery of the user equipment, a surface temperature of a central processing unit (CPU), a temperature of a front screen or a rear shell of the user equipment, or the like.

In an embodiment, it is assumed that the user equipment sends the first signaling at time T0, the timer starts timing at time T0, and a timing duration of the timer is t1, then the user equipment can detect the equipment temperature at time T0+t1.

In step 103, a user equipment state indicated by the equipment temperature is indicated to the base station.

In an embodiment, the user equipment state can be that the user equipment is no longer overheated or it is still overheated.

In an embodiment, a method for indicating the user equipment state indicated by the equipment temperature to the base station will be described in detail with reference to the embodiment illustrated in FIG. 2, and will not be elaborated here.

In an exemplary scenario, as illustrated in FIG. 1B, a base station 10 and user equipment (e.g. a smart phone, a tablet, etc.) 20 are included. After sending first signaling for requesting for a cooling configuration to the base station, the user equipment 20 can start a timer of a first preset time period, detect an equipment temperature at the time when the timer times out, and indicate to the base station 10 a user equipment state indicated by the equipment temperature, such as the equipment is still overheated, the equipment is no longer overheated, or the like.

In this embodiment, with the foregoing steps 101-103, the first signaling for requesting for the cooling configuration can be sent to the base station when the user equipment is overheated, so that the problem of UE overheating can be solved by reducing the UE configuration by the base station, and problems of transmission interruption of transaction data caused in relevant technologies can be avoided.

For details on how to protect the user equipment, please refer to subsequent embodiments.

Technical solutions provided by embodiments of the present disclosure will be described below with reference to specific embodiments.

Figure 2:
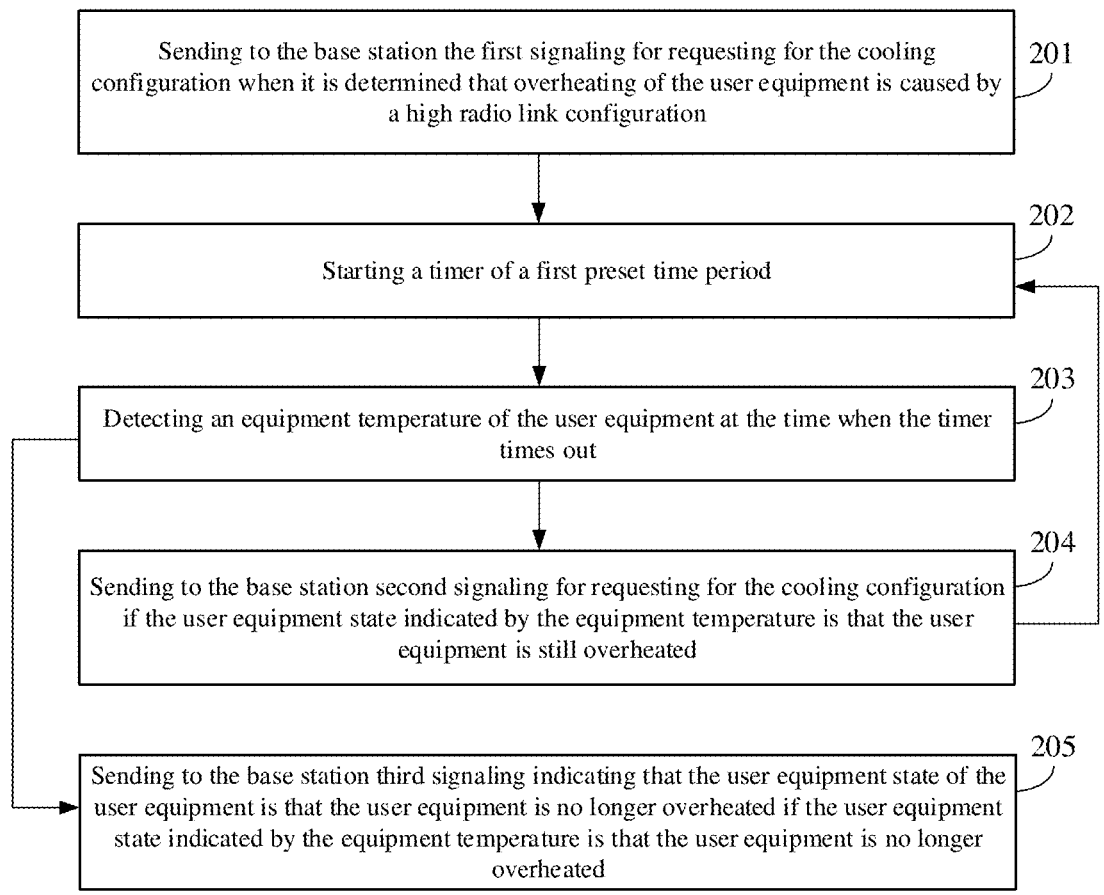
FIG. 2 is a flowchart illustrating another method for protecting user equipment according to an exemplary embodiment.

FIG. 2 is a flowchart illustrating another method for protecting user equipment according to an exemplary embodiment. Exemplary explanations of this embodiment will be made with examples of the foregoing methods provided by the embodiments of the present disclosure and exemplary fashions of sending to the base station the signaling for requesting for the cooling configuration. As illustrated in FIG. 2, the method includes the following steps.

In step 201, when it is determined that overheating of the user equipment is caused by a high radio link configuration, first signaling for requesting for a cooling configuration is sent to the base station.

In an embodiment, cooling assistance information is carried in the first signaling and the cooling assistance information is used for instructing the base station to determine a radio link configuration to which the user equipment is to be adjusted.

information included in the second signaling to assist the base station to solve the problem of the UE overheating.

In an embodiment, after the second signaling is sent to the base station, the timer of the first preset time period is restarted, that is, step 202 is performed.

In step 205, if the user equipment state indicated by the equipment temperature is that the user equipment is no longer overheated, third signaling indicating that the user equipment state is that the user equipment is no longer overheated is sent to the base station.

In an embodiment, the third signaling may be UEAssistanceInformation signaling in which the cooling assistance information is empty, and reference can be made to the following codes:

```
UEAssistanceInformation-r11 ::=        SEQUENCE {
UE assistance information
    criticalExtensions                 CHOICE {
        c1                             CHOICE {
        ueAssistanceInformation-r11    UEAssistanceInformation-r11-IEs,
        spare3 NULL, spare2 NULL, spare1 NULL
        },
        criticalExtensionsFuture       SEQUENCE { }
    }
}
UEAssistanceInformation-r11-IEs ::=    SEQUENCE {
    powerPrefIndication-r11            ENUMERATED         {normal,
lowPowerConsumption} OPTIONAL,
    lateNonCriticalExtension           OCTET STRING       OPTIONAL,
    nonCriticalExtension               UEAssistanceInformation-v14xy-IEs
    OPTIONAL
}
UEAssistanceInformation-v14xy-IEs ::=          SEQUENCE       {
    bw-Preference-r14                  BW-Preference-r14
bandwidth preference OPTIONAL,
    sps-AssistanceInformation-r14      SPS-AssistanceInformation-r14
    SPS assistance information OPTIONAL,
    temp-UE-Capability-r14             Temp-UE-Capability-r14OPTIONAL
    temporary UE capability
    nonCriticalExtension               SEQUENCE { } OPTIONAL
}
Temp-UE-Capability-r14-IEs ::=         SEQUENCE       {
    nonCriticalExtension               SEQUENCE { } OPTIONAL
}
```

In step 202, a timer of a first preset time period is started.

In step 203, an equipment temperature of the user equipment at a time when the timer times out is detected, and either step 204 or 205 is performed.

In an embodiment, for steps 202 and 203, reference can be made to the description of steps 101 and 102 of the embodiment illustrated in FIG. 1A, and details will not be described here.

In step 204, if a user equipment state indicated by the equipment temperature shows that the user equipment is still overheated, second signaling for requesting for the cooling configuration is sent to the base station.

In an embodiment, the first signaling and the second signaling can be the same, that is, the cooling assistance information included in the first signaling to assist the base station to solve the problem of the UE overheating is the same as the cooling assistance information included in the second signaling to assist the base station to solve the problem of the UE overheating. Alternatively, the first signaling can be different from the second signaling, that is, the cooling assistance information included in the first signaling to assist the base station to solve the problem of the UE overheating is different from the cooling assistance In an embodiment, when the user equipment is no longer overheated, the user equipment state can be indicated by other signaling instead of sending the third signaling as described above.

In an embodiment, it is possible that no signaling is sent to the base station when the user equipment is no longer overheated.

In an embodiment, the timer is stopped when the user equipment is no longer overheated.

In this embodiment, with the foregoing steps 201-205, the second signaling can be sent to the base station when the equipment temperature indicates that the user equipment is still overheated, and the base station can be instructed to continue reducing the radio link configuration to help the UE to cool down, and the third signaling is sent to the base station when the equipment temperature indicates that the user equipment is no longer overheated, so that the base station can obtain the equipment state indicating that the user equipment is no longer overheated in time, and thus can provide a high radio link configuration for the UE to ensure the data transmission rate of the UE.

Figure 3:
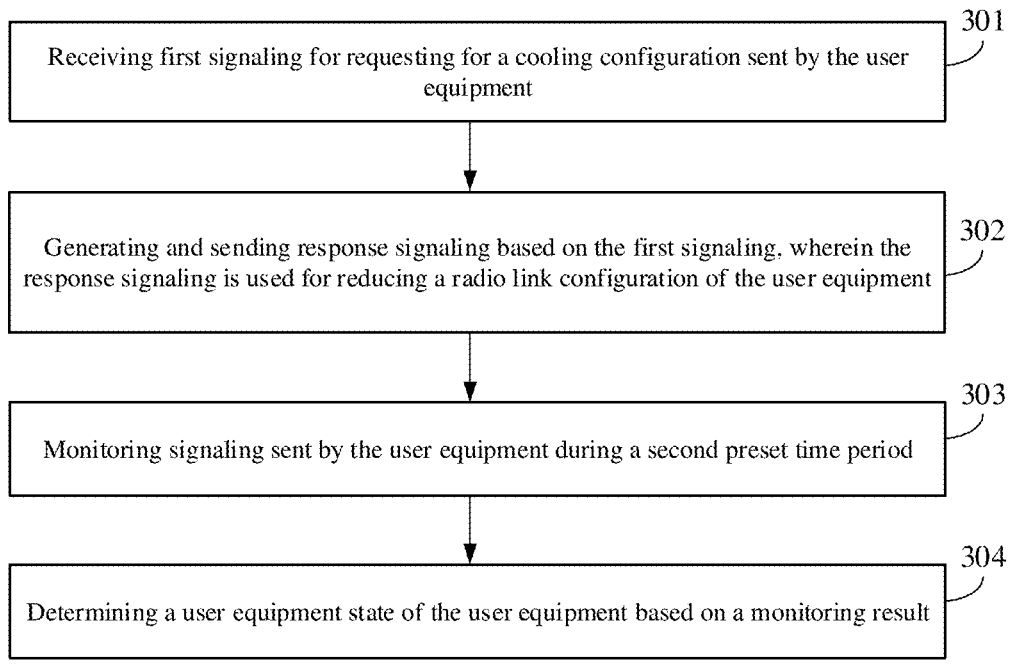
FIG. 3 is a flowchart illustrating a method for protecting user equipment according to an exemplary embodiment.

FIG. 3 is a flowchart illustrating a method for protecting user equipment according to an exemplary embodiment. The method can be applied to a base station, and as illustrated in FIG. 3, the method includes the following steps 301-304.

In step 301, first signaling for requesting for a cooling configuration sent from user equipment is received.

In step 302, response signaling is generated and sent based on the first signaling, where the response signaling is used for reducing a radio link configuration of the user equipment.

In an embodiment, the first signaling carries cooling assistance information for instructing the base station to solve the problem of the user equipment overheating. The cooling assistance information can include information indicative of low performance caused by overheat, temporary user equipment capability represented by user equipment category due to overheat, and/or temporary user equipment capability represented by radio frequency parameters due to overheat.

In an embodiment, the temporary user equipment capability represented by the user equipment category due to overheat may be interpreted as the temporary user equipment capability corresponding to the user equipment category, and if the system specifies temporary user equipment capability of a certain category of user equipment in the case of overheating, the base station can determine the temporary user equipment capability according to the user equipment category in the first signaling. In an embodiment, the temporary user equipment capability represented by the radio frequency parameters due to overheat can be interpreted as the temporary user equipment capability corresponding to the radio frequency parameters, and if the system specifies temporary user equipment capability of a certain category of user equipment in the case of overheating, the base station can determine the temporary user equipment capability according to the radio frequency parameters in the first signaling.

In an embodiment, the base station can determine a radio link configuration to which the user equipment is to be adjusted according to the temporary user equipment capability of the user equipment and to generate the response signaling.

In step 303, signaling sent by the user equipment is monitored during a second preset time period.

In an embodiment, the second preset time period is longer than the first preset time period, and it is dynamically configured by the base station. For example, if the first signaling of the user equipment indicates that the current performance of the user equipment is very low and the overheating problem is serious, the base station can set the second preset time period to be longer, and if the overheating problem of the user equipment is not that serious, the base station can set the second preset time period to be shorter. In an embodiment, the second preset time period is a fixed value specified by the system, that is, the second preset time period is a static value specified by the system and will not be changed. In an embodiment, the second preset time period is determined based on the implementation of the base station, which can be understood as that a base station provider of the base station has designed the second preset time period, which is generally a fixed value, while implementing the base station. For example, the second preset time period of 10 minutes is implemented in Huawei's base station and the second preset time period of 11 minutes is implemented in Zhongxing's base station.

In step 304, a user equipment state of the user equipment is determined based on a monitoring result.

In an embodiment, the monitoring result can be that no signaling is monitored. In another embodiment, the monitoring result can be that signaling for requesting for the cooling configuration again is monitored. In still another embodiment, the monitoring result can be that signaling for indicating that the user equipment is no longer overheated is monitored.

Figure 4:
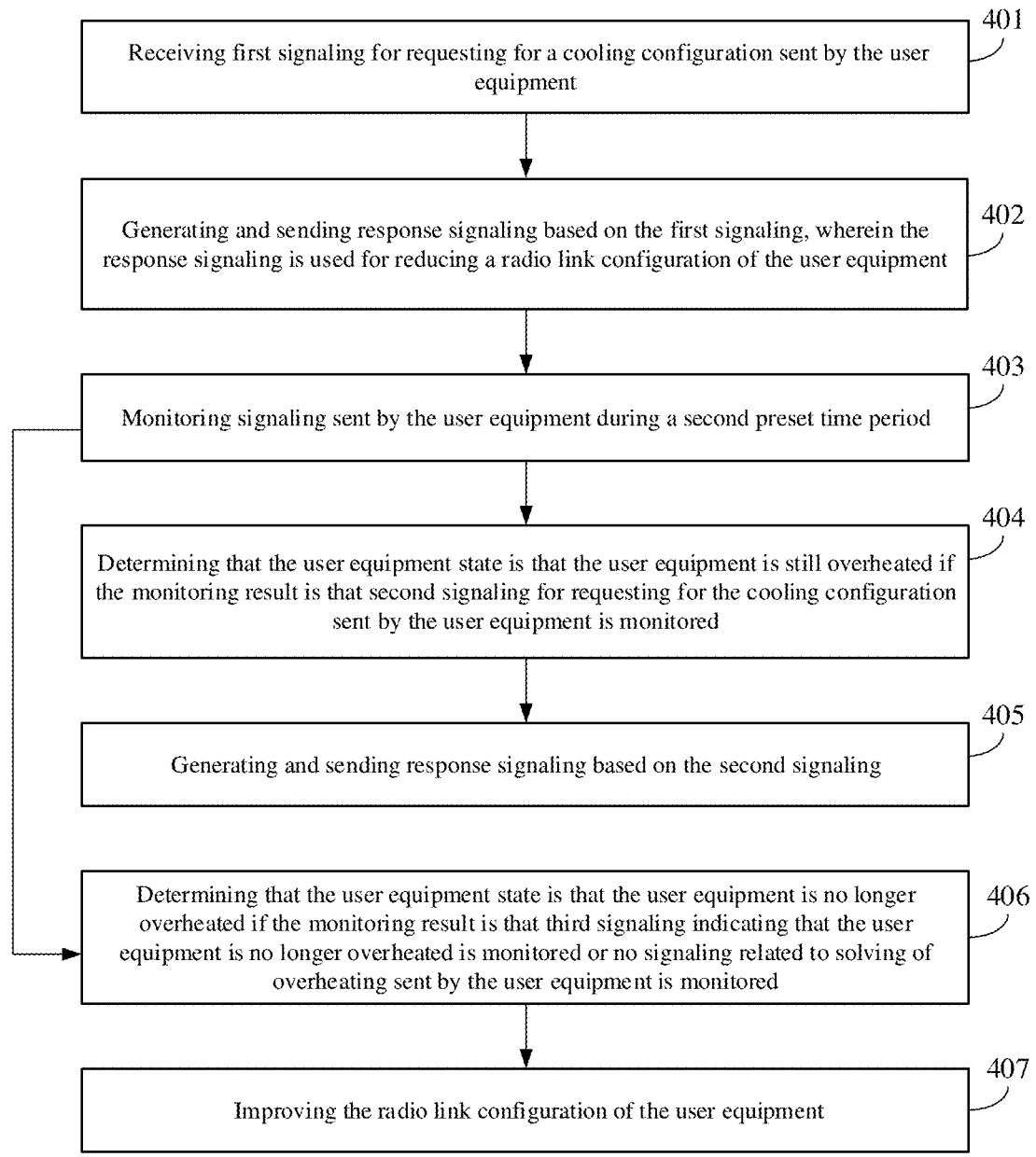
FIG. 4 is a flowchart illustrating another method for protecting user equipment according to an exemplary embodiment.

In an embodiment, for methods for determining the user equipment state based on the monitoring result, reference can be made to the subsequent description of the embodiment illustrated in FIG. 4, which will not be described in detail here.

In an exemplary scenario, as illustrated in FIG. 1B, a base station 10 and user equipment (e.g. a smart phone, a tablet, etc.) 20 are included. After sending first signaling for requesting for a cooling configuration to the base station, the user equipment 20 can start a timer of a first preset time period, detect an equipment temperature at the time when the timer times out, and indicate to the base station 10 a user equipment state indicated by the equipment temperature, such as the device is still overheated or is no longer overheated. The base station 10 can return response signaling carrying a cooling configuration upon receiving the first signaling, monitor signaling of the user equipment for a second preset time period, and determine a user equipment state of the user equipment 20 based on the monitoring result.

In the present embodiment, with the foregoing steps 301-304, when receiving the first signaling of the user equipment which requests for the cooling configuration, the base station can configure a low radio link configuration for the user equipment and help the user equipment to decrease its equipment temperature. In addition, the equipment state of the user equipment can be obtained in time by determining the user equipment state based on the monitoring result during the second preset time period.

For details on how to protect the user equipment, please refer to subsequent embodiments.

Technical solutions provided by embodiments of the present disclosure will be described below with reference to specific embodiments.

FIG. 4 is a flowchart illustrating another method for protecting user equipment according to an exemplary embodiment. Exemplary explanations of this embodiment will be made with examples of the foregoing methods provided by the embodiments of the present disclosure and exemplary fashions on how to determine the user equipment state and configure a high radio link configuration for the user equipment when the user equipment is no longer overheated. As illustrated in FIG. 4, the method includes the following steps.

In step 401, first signaling for requesting for a cooling configuration sent by user equipment is received.

In step 402, response signaling is generated and sent based on the first signaling, wherein the response signaling is used for reducing a radio link configuration of the user equipment.

In step 403, signaling sent by the user equipment is monitored during a second preset time period, and either step 404 or 406 is performed.

In step 404, if the monitoring result is that second signaling for requesting for the cooling configuration sent by the user equipment is monitored, it is determined that the user equipment state is that the user equipment is still overheated.

In an embodiment, the first signaling and the second signaling can be the same, that is, the cooling assistance information included in the first signaling for assisting the base station to solve the problem of the UE overheating is the same as the cooling assistance information included in the second signaling for assisting the base station to solve the problem of the UE overheating. Alternatively, the first signaling can be different from the second signaling, that is, the cooling assistance information included in the first signaling for assisting the base station to solve the problem of the UE overheating is different from the cooling assistance information included in the second signaling for assisting the base station to solve the problem of the UE overheating.

In step 405, response signaling is generated and sent based on the second signaling.

In an embodiment, the response signaling generated based on the second signaling can be the same as or different from the response signaling generated based on the first signaling. In particularly, the response signaling can be generated based on the cooling assistance information in the second signaling.

In step 406, if the monitoring result is that third signaling indicating that the user equipment is no longer overheated is monitored or no signaling related to solving of overheating sent by the user equipment is monitored, it is determined that the user equipment state is no longer overheated.

In step 407, the radio link configuration of the user equipment is improved.

In this embodiment, with the foregoing steps 401-407, the base station can determine the user equipment state based on the specific monitoring result, and can improve the radio link configuration of the user equipment when the UE is no longer overheated so as to ensure a data transmission rate of the UE. When the UE is still overheated, the base station can further reduce the radio link configuration of the user equipment to decrease the equipment temperature of the user equipment as soon as possible.

Figure 5:
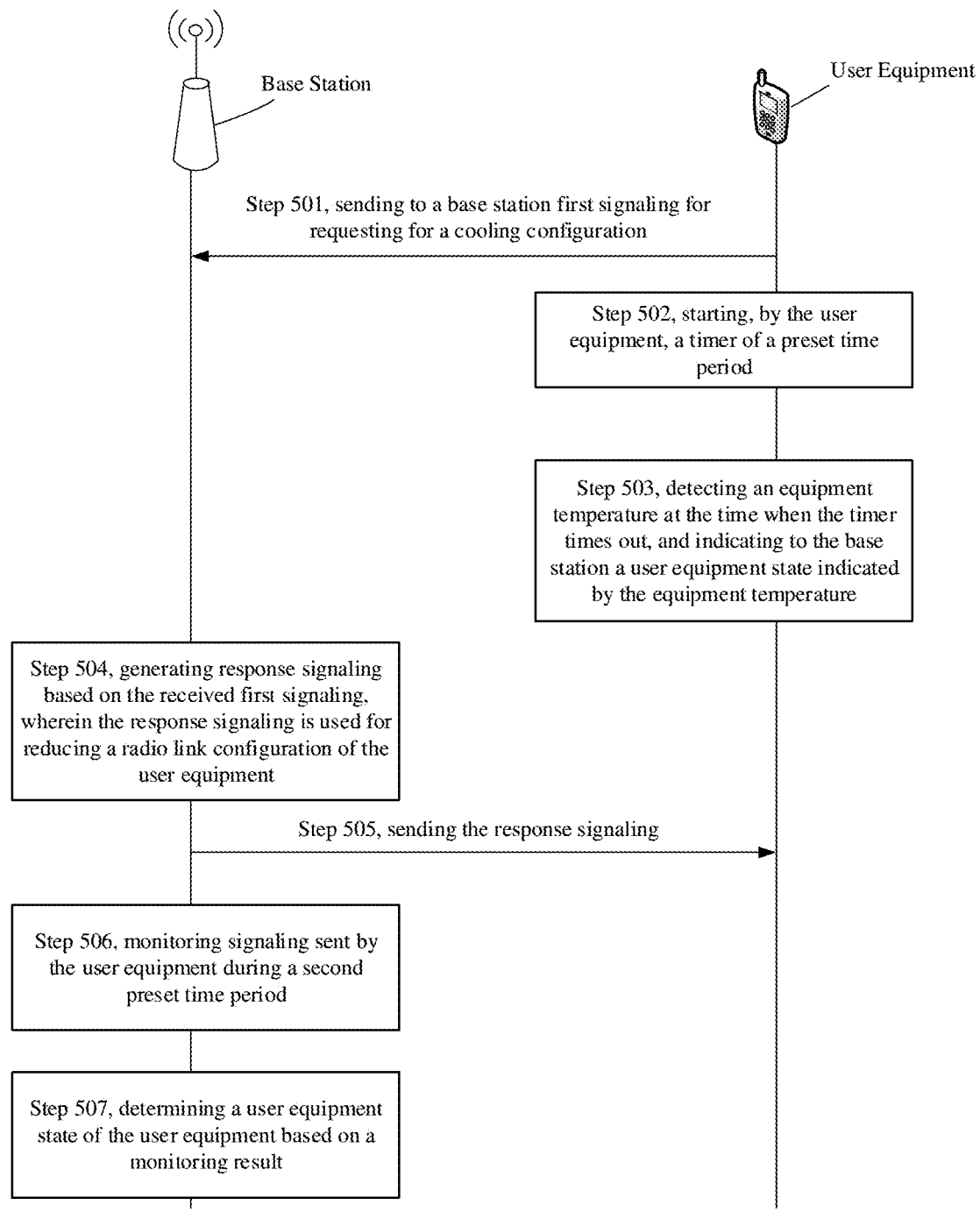
FIG. 5 is a flowchart illustrating a method for protecting user equipment by signaling interaction between a base station and the user equipment according to an exemplary embodiment.

FIG. 5 is a flowchart illustrating another method for protecting user equipment from overheating by interaction between a base station and the user equipment according to an exemplary embodiment. Exemplary illustration of this embodiment will be made with examples of the foregoing methods provided by the embodiments of the present disclosure and examples on protecting the user equipment from overheating by interaction between the base station and the user equipment. As illustrated in FIG. 5, the method includes the following steps.

In step 501, when the user equipment becomes overheated due to a high radio link configuration, the user equipment sends first signaling for requesting for a cooling configuration to the base station.

In step 502, the user equipment starts a timer of a preset time period.

In an embodiment, the timer of the preset time period is started immediately after the first signaling is sent, and thus time at which the timer starts timing can be interpreted as time at which the first signaling is sent.

In step 503, the user equipment detects an equipment temperature at a time when the timer times out and indicates to the base station a user equipment state indicated by the equipment temperature.

In step 504, the base station generates and sends response signaling based on the received first signaling, wherein the response signaling is used for reducing the radio link configuration of the user equipment.

In step 505, the base station sends the response signaling.

In step 506, the base station monitors signaling sent by the user equipment for a second preset time period.

In step 507, the base station determines the user equipment state of the user equipment based on the monitoring result.

In this embodiment, with the foregoing steps 501-507, when determining that the overheating is caused by the high radio link configuration, the user equipment can send the first signaling for requesting for the cooling configuration to the base station, start the timer of the first preset time period after sending the first signaling, detect the equipment temperature at the time when the timer times out, and indicate to the base station the user equipment state indicated by the equipment temperature such as the user equipment is still overheated, is no longer overheated or the like, so that the problem of UE overheating can be solved by reducing the UE configuration by the base station, and by indicating to the base station the user equipment state, a high radio link configuration for the UE can be configured by the base station in time when the UE is not overheated so as to ensure a data transmission rate of the UE.

Figure 6:
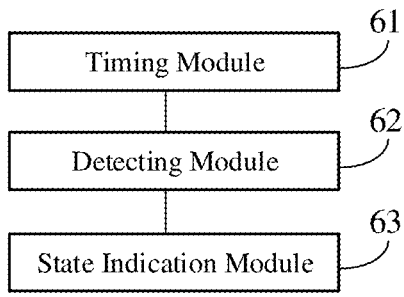
FIG. 6 is a block diagram illustrating a device for protecting user equipment according to an exemplary embodiment.

FIG. 6 is a block diagram illustrating a device for protecting user equipment, which is applied to the user equipment, according to an exemplary embodiment. As illustrated in FIG. 6, the device includes:

a timing module 61 configured to start a timer of a first preset time period after first signaling for requesting for a cooling configuration is sent to a base station;

a detecting module 62 configured to detect an equipment temperature of the user equipment at a time when the timer started by the timing module times out; and a state indication module 63 configured to indicate to the base station a user equipment state indicated by the equipment temperature.

Figure 7:
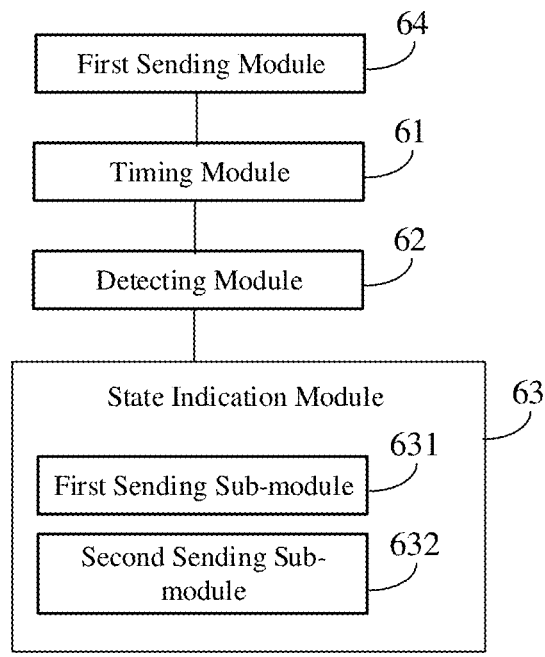
FIG. 7 is a block diagram illustrating another device for protecting user equipment according to an exemplary embodiment.

FIG. 7 is a block diagram illustrating another device for protecting user equipment according to an exemplary embodiment. As illustrated in FIG. 7, in an embodiment, the device is based on the foregoing embodiment illustrated in FIG. 6.

In an embodiment, the device further includes:

a first sending module 64 configured to send to the base station the first signaling for requesting for the cooling configuration when it is determined that overheating of the user equipment is caused by a high radio link configuration.

In an embodiment, the first signaling carries cooling assistance information, and the cooling assistance information is used for instructing the base station to determine a radio link configuration to which the user equipment is to be adjusted.

In an embodiment, the state indication module 63 includes a first sending sub-module 631 and a second sending sub-module 632.

The first sending sub-module 631 is configured to send to the base station second signaling for requesting for the cooling configuration if the user equipment state indicated by the equipment temperature is that the user equipment is still overheated.

The second sending sub-module 632 is configured to send to the base station third signaling indicating that the user equipment state of the user equipment is no longer overheated if the user equipment state indicated by the equipment temperature is that the user equipment is no longer overheated.

In an embodiment, the third signaling is the first signaling in which the cooling assistance information is empty.

Figure 8:
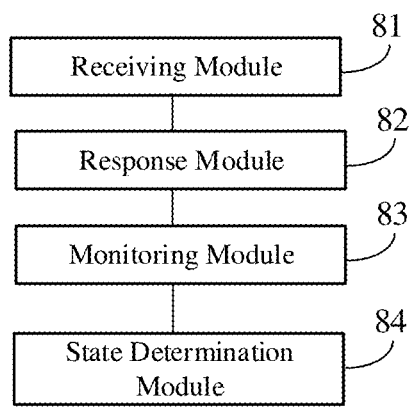
FIG. 8 is a block diagram illustrating a device for protecting user equipment according to an exemplary embodiment.

FIG. 8 is a block diagram illustrating a device for protecting user equipment, which is applied to a base station, according to an exemplary embodiment. As illustrated in FIG. 8, the device includes:

a receiving module 81 configured to receive first signaling for requesting for a cooling configuration sent by the user equipment;

a response module 82 configured to generate and send response signaling based on the first signaling received by the receiving module, wherein the response signaling is used for reducing a radio link configuration of the user equipment;

a monitoring module 83 configured to monitor signaling sent by the user equipment during a second preset time period after the first signaling is received by the receiving module; and a state determination module 84 configured to determine a user equipment state of the user equipment based on a monitoring result.

Figure 9:
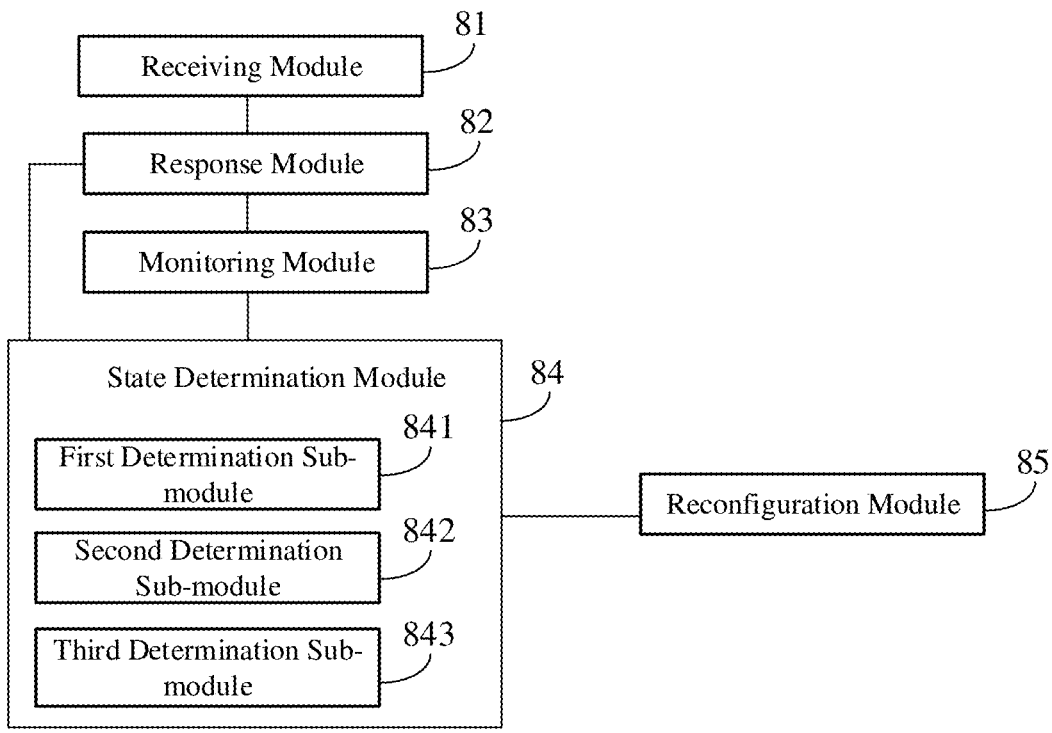
FIG. 9 is a block diagram illustrating another device for protecting user equipment according to an exemplary embodiment.

FIG. 9 is a block diagram illustrating another device for protecting user equipment according to an exemplary embodiment. As illustrated in FIG. 9, on the basis of the foregoing embodiment illustrated in FIG. 8, in an embodiment, the second preset time period is dynamically configured by the base station, is a fixed value specified by the system, or is determined based on the implementation of the base station.

In an embodiment, the device further includes:

a reconfiguration module 85 configured to improve the radio link configuration of the user equipment when the user equipment state is that the user equipment is no longer overheated; and the response module 82 configured to perform an operation of generating and sending the response signaling when the user equipment state is that the user equipment is still overheated.

In an embodiment, the state determination module 84 includes:

a first determination sub-module 841 configured to determine that the user equipment state is that the user equipment is still overheated if the monitoring result is that second signaling for requesting for the cooling configuration sent by the user equipment is monitored; and a second determination sub-module 842 configured to determine that the user equipment state is that the user equipment is no longer overheated if the monitoring result is that third signaling indicating that the user equipment is no longer overheated is monitored.

In an embodiment, the state determination module 84 includes:

a third determination sub-module 843 configured to determine that the user equipment state is no longer overheated if the monitoring result is that no signaling related to solving of overheating sent by the user equipment is monitored.

With respect to the devices in the above embodiments, the specific manners for performing operations by individual modules have been described in detail in the embodiments of the relative methods, which will not be elaborated herein.

Figure 10:
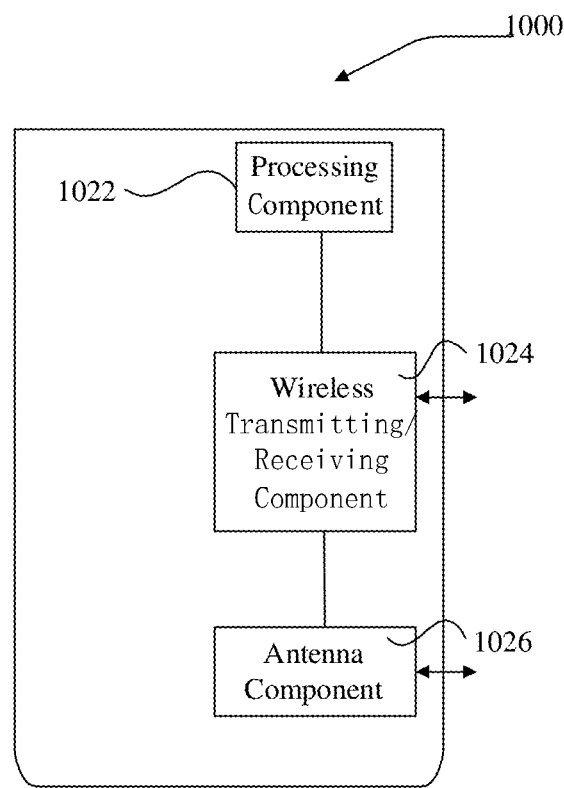
FIG. 10 is a block diagram illustrating a device applicable for protecting user equipment according to an exemplary embodiment.

FIG. 10 is a block diagram of a device applicable for protecting user equipment according to an exemplary embodiment. The device 1000 can be provided as a base station. Referring to FIG. 10, the device 1000 includes a processing component 1022, a wireless transmitting/receiving component 1024, an antenna component 1026 and a signal processing portion specific to a wireless interface. The processing component 1022 may further include one or more processors.

One of the processing components 1022 may be configured to perform the above-described methods for protecting user equipment.

In exemplary embodiments, there is also provided a non-transitory computer-readable storage medium including instructions executable by the processing component 1022 in the device 1000, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored thereon instructions that, when executed by a processor of a base station, causes the base station to perform the method for protecting the user equipment disclosed in the second aspect, the method including:

receiving first signaling for requesting for a cooling configuration sent by the user equipment;

generating and sending response signaling based on the first signaling, wherein the response signaling is used for reducing a radio link configuration of the user equipment;

monitoring signaling sent by the user equipment during a second preset time period; and determining a user equipment state of the user equipment based on a monitoring result.

Figure 11:
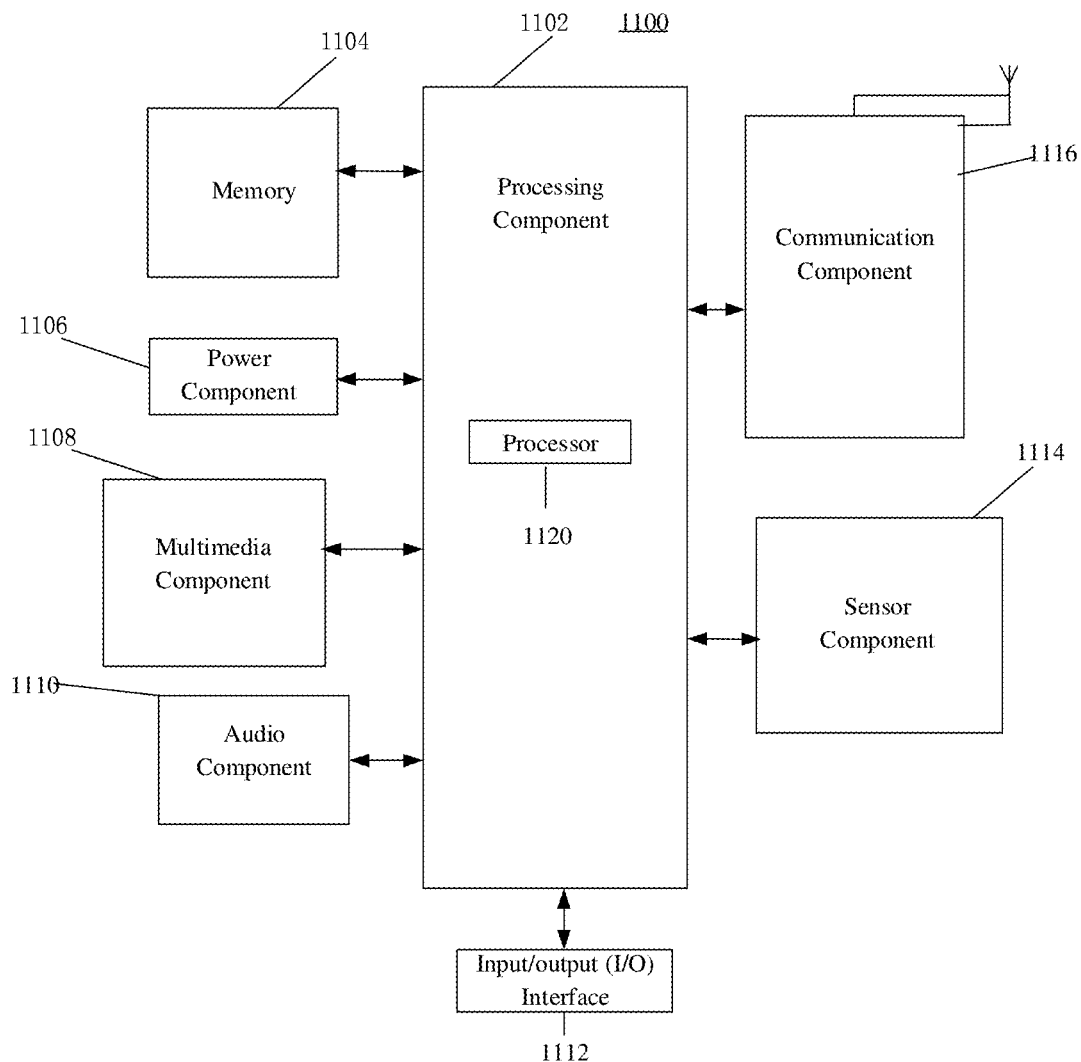
FIG. 11 is a block diagram illustrating a device applicable for protecting user equipment according to an exemplary embodiment.

FIG. 11 is a block diagram of a device applicable for protecting user equipment according to an exemplary embodiment. For example, the device 1100 may be a first device, such as a smart phone.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a distance sensor, a pressure sensor, or a temperature sensor.

The communication component 1116 is configured to facilitate communication, wired or wirelessly, between the device 1100 and other devices. The device 1100 can access a wireless network based on a communication standard, such as WI-FI, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a BLUETOOTH (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for protecting user equipment.

In exemplary embodiments, there is also provided a non-transitory computer-readable storage medium including instructions, such as included in the memory 1104, executable by the processor 1120 in the device 1100, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium storing instructions which, when executed by a processor of a device, enable the device to perform the method for protecting user equipment according to the first aspect, the method including:

starting a timer of a first preset time period after first signaling for requesting for a cooling configuration is send to a base station;

detecting an equipment temperature of the user equipment at a time when the timer times out; and indicating to the base station a user equipment state indicated by the equipment temperature.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for protecting user equipment, applied to the user equipment, the method comprising:

starting a timer of a preset time period after first signaling for requesting for a cooling configuration is sent to a base station, wherein the first signaling carries cooling assistance information configured to instruct the base station to determine a radio link configuration to which the user equipment is to be adjusted;

detecting an equipment temperature of the user equipment at a time when the timer times out; and indicating to the base station a user equipment state indicated by the equipment temperature, wherein the indicating to the base station the user equipment state indicated by the equipment temperature comprises:

sending, to the base station, second signaling indicating that the user equipment state of the user equipment is that the user equipment is no longer overheated when the user equipment state indicated by the equipment temperature is that the user equipment is no longer overheated, wherein the second signaling is the first signaling in which the cooling assistance information is empty.

2. The method according to claim 1, further comprising:
sending to the base station the first signaling for requesting for the cooling configuration when it is determined that overheating of the user equipment is caused by a high radio link configuration.

3. The method according to claim 1, wherein the indicating to the base station the user equipment state indicated by the equipment temperature further comprises:
sending to the base station third signaling for requesting for the cooling configuration when the user equipment state indicated by the equipment temperature is that the user equipment is still overheated.

4. A method for protecting user equipment, applied to a base station, the method comprising:
receiving first signaling for requesting for a cooling configuration sent by the user equipment;
generating and sending response signaling based on the first signaling, wherein the response signaling is configured to reduce a radio link configuration of the user equipment;
monitoring signaling sent by the user equipment during a preset time period; and
determining a user equipment state of the user equipment based on a monitoring result,
wherein the determining the user equipment state of the user equipment based on the monitoring result comprises:
determining that the user equipment state is that the user equipment is still overheated when the monitoring result is that second signaling for requesting for the cooling configuration sent by the user equipment is monitored; and
determining that the user equipment state is that the user equipment is no longer overheated when the monitoring result is that third signaling indicating that the user equipment is no longer overheated is monitored.

5. The method according to claim 4, wherein the preset time period is dynamically configured by the base station, is a fixed value specified by a system, or is determined based on an implementation of the base station.

6. The method according to claim 4, further comprising:
improving the radio link configuration of the user equipment when the user equipment state is that the user equipment is no longer overheated; and
performing an operation of generating and sending the response signaling when the user equipment state is that the user equipment is still overheated.

7. The method according to claim 4, wherein the determining the user equipment state of the user equipment based on the monitoring result comprises:
determining that the user equipment state is that the user equipment is no longer overheated when the monitoring result is that no signaling related to solving of overheating sent by the user equipment is monitored.

8. User equipment, comprising:
a processor; and
a memory storing instructions executable by the processor;
wherein the processor is configured to:
start a timer of a preset time period after first signaling for requesting for a cooling configuration is sent to a base station, wherein the first signaling carries cooling assistance information configured to instruct the base station to determine a radio link configuration to which the user equipment is to be adjusted;
detect an equipment temperature of the user equipment at a time when the timer times out; and
indicate to the base station a user equipment state indicated by the equipment temperature,
wherein the processor is further configured to:
send to the base station second signaling indicating that the user equipment state of the user equipment is that the user equipment is no longer overheated when the user equipment state indicated by the equipment temperature is that the user equipment is no longer overheated,
wherein the second signaling is the first signaling in which the cooling assistance information is empty.

9. The user equipment according to claim 8, wherein the processor is further configured to:
send to the base station the first signaling for requesting for the cooling configuration when it is determined that overheating of the user equipment is caused by a high radio link configuration.

10. The user equipment according to claim 8, wherein the processor is further configured to:
send to the base station third signaling for requesting for the cooling configuration when the user equipment state indicated by the equipment temperature is that the user equipment is still overheated.

* * * * *